United States Patent [19]

Kunz et al.

[11] 3,994,748

[45] Nov. 30, 1976

[54] METHOD FOR FEEDING REACTANT GAS TO FUEL CELLS IN A STACK AND APPARATUS THEREFOR

[75] Inventors: Harold R. Kunz, Vernon; Carl A. Reiser, Glastonbury, both of Conn.

[73] Assignee: United Technologies Corporation, Hartford, Conn.

[22] Filed: May 2, 1975

[21] Appl. No.: 574,127

[52] U.S. Cl. ................................. 429/13; 429/34
[51] Int. Cl.² ......................................... H01M 4/00
[58] Field of Search ................................. 136/86 R

[56] References Cited
UNITED STATES PATENTS

| 409,366 | 8/1889 | Mond et al. | 136/86 R |
|---|---|---|---|
| 3,533,847 | 10/1970 | Maurer | 136/86 R |

Primary Examiner—John H. Mack
Assistant Examiner—H. A. Feeley
Attorney, Agent, or Firm—Stephen E. Revis

[57] ABSTRACT

A flow scheme for feeding a reactant gas to the cells of a fuel cell stack wherein the cells are connected electrically in series. For example, the fuel gas is passed in parallel over a portion of each fuel electrode and thereupon into a mixing manifold which directs the exhausted gases in parallel over a different portion of each fuel electrode and thereupon into another manifold. This is continued, depending upon the stack configuration, with the exhausted gases passing back and forth in parallel over different portions of the fuel electrodes and exhausting into a manifold until the fuel gas has covered the entire fuel electrode of each cell in the stack. This reduces the harmful effect of a blockage within the reactant gas chamber of a cell and also reduces the harmful effect caused by a maldistribution of current in one of the cells in the stack.

17 Claims, 4 Drawing Figures

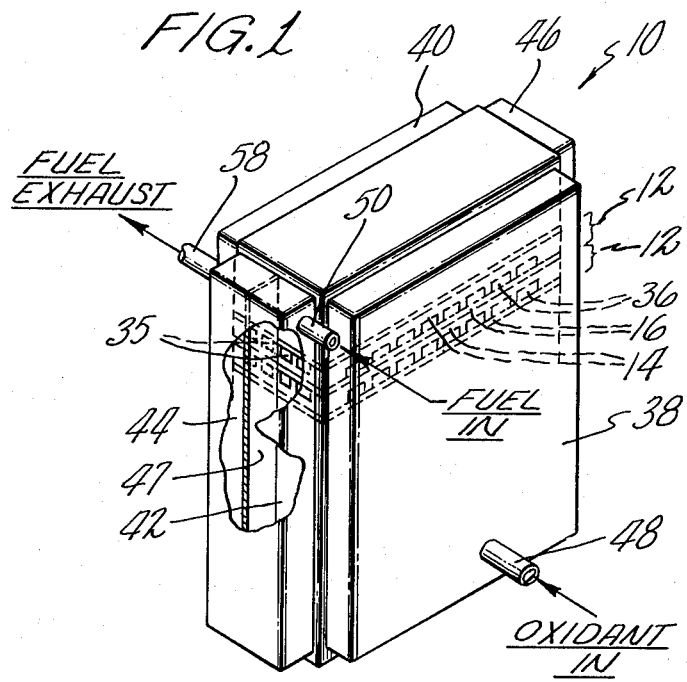
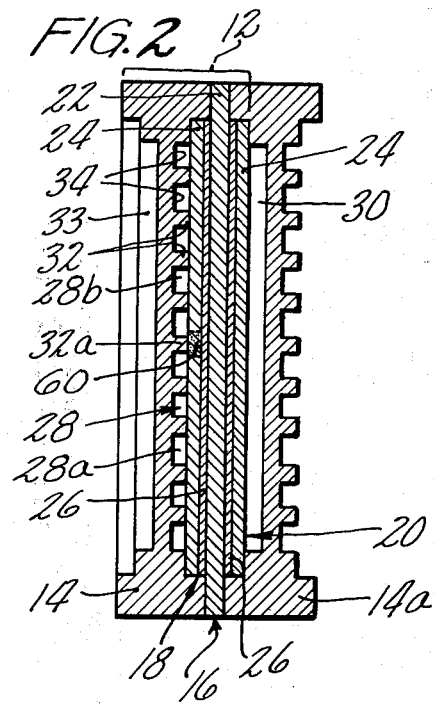
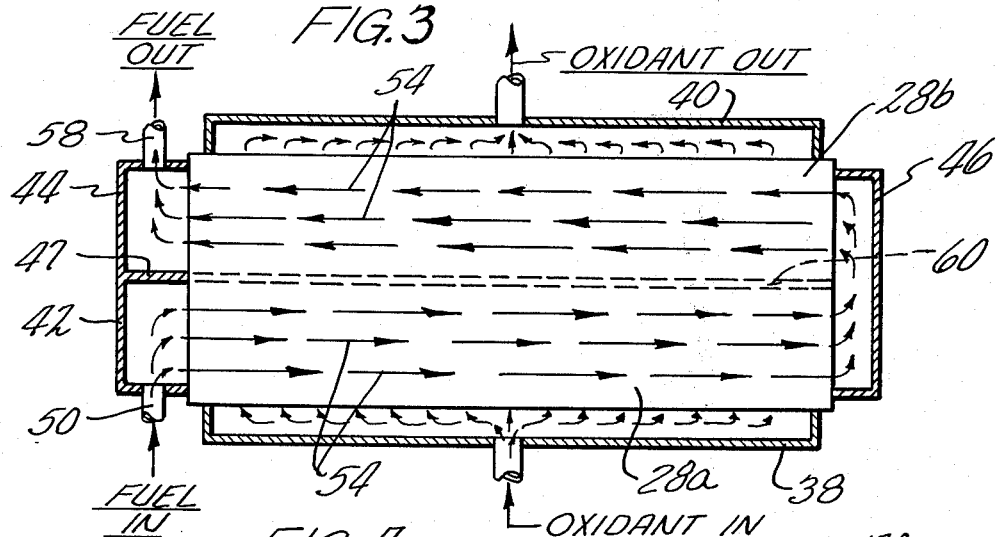
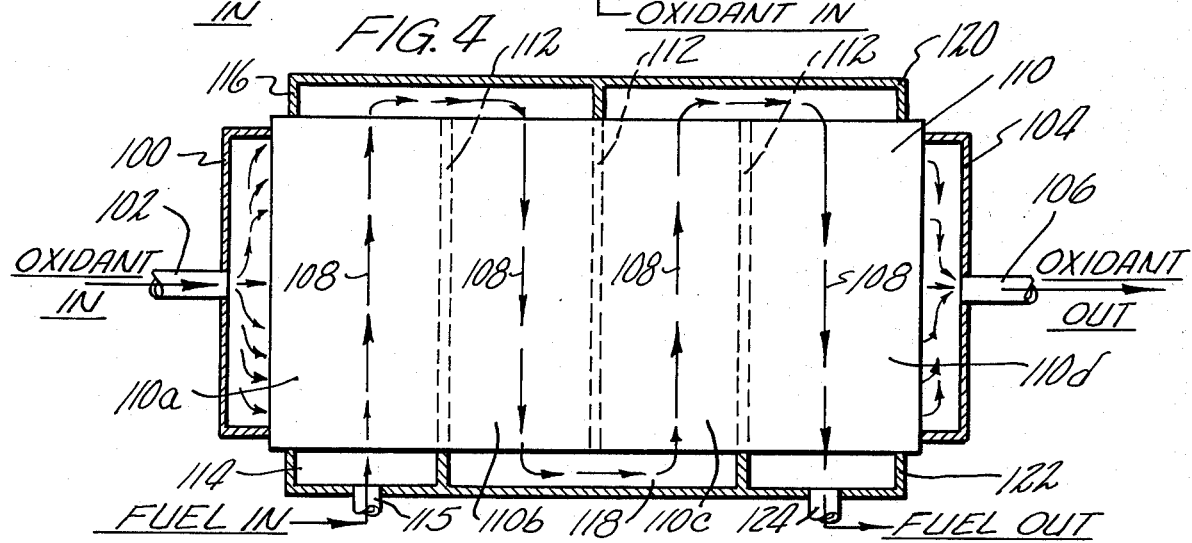

METHOD FOR FEEDING REACTANT GAS TO FUEL CELLS IN A STACK AND APPARATUS THEREFOR

BACKGROUND OF THE INVENTION

1. Field of the Invention

This invention relates to fuel cells and more particularly to a plurality of fuel cells connected electrically in series in a stack.

2. Description of the Prior Art

A basic fuel cell comprises an electrode spaced apart from a cathode electrode with an electrolyte disposed therebetween in a compartment formed between the two electrodes; each electrode also includes a catalyst layer on the electrolyte side thereof. On the nonelectrolyte side of the anode electrode is a reactant gas chamber for carrying a fuel, and on the nonelectrolyte side of the cathode electrode is a reactant gas chamber for carrying an oxidant. The electrodes are constructed so that the gas diffuses therethrough and comes into contact with the electrolyte in the catalyst layer thereby causing an electrochemical reaction whereby ions travel from the cathode electrode through the electrolyte to the anode electrode. This flow of ions is basically the electric current produced by the cell. In a fuel cell power plant a plurality of fuel cells are connected electrically in series through plates separating adjacent cells, thereby forming a stack. These plates, in combination with the electrodes adjacent thereto, generally define the reactant gas passages hereinbefore referred to. The voltage across the stack is the sum of the voltage drops across the individual cells, which is a function of the current produced by each cell. The amount of current produced by each cell is directly proportional to the amount of reactant gas utilized in the electrochemical reaction.

In one form of the prior art the fuel passes only once in parallel through the cells in the stack, entering at one side, traveling straight through and exiting at the other side. If one of the cells in the stack has a maldistribution of current, such as may occur due to an uneven catalyst layer, then a certain area of that cell is not passing its fair share of current. The remaining portion of that cell must now carry the entire current. This remaining portion of the cell may, for example, be carrying only 80% of the fuel flowing through the cell, but it now must support 100% of the current. If there is not enough fuel to support the current the cell begins to burn the structural components, sometimes resulting in a cell or stack failure. This not only occurs in the individual cell which has the maldistribution, but it also occurs in several cells immediately downstream (in terms of current flow) from the bad cell.

One solution has been to flow the fuel through the cells in serpentine fashion such that, in theory, the entire mass of fuel entering the cell passes over every portion of the electrode. Now, even though only, say 80% of the cell is carrying 100% of the current, 100% of the fuel passes over the 80% of the cell and is available to support 100% of the current.

The serpentine cell design is not, however, satisfactory for a cell having a blockage in a fuel chamber thereby preventing the flow of fuel therethrough. That cell will necessarily be deficient in hydrogen wherein structural corrosion and ultimate cell and/or stack failure may occur. Also, a serpentine flow path results in maldistribution of the reactant gas to certain areas of the cell causing flow discontinuities, such as result when the gas travels around corners of the serpentine path. This reduces fuel utilization.

SUMMARY OF THE INVENTION

One object of the present invention is to reduce the undesirable consequences of maldistribution of a reactant gas through cells connected electrically in series in a fuel cell stack.

Another object of the present invention is to reduce the undesirable consequences of a nonuniform current distribution within cells connected electrically in series in a fuel cell stack.

A further object of the present invention is higher reactant gas utilization in a stack of fuel cells connected electrically in series.

Accordingly, in the present invention these objects are accomplished by passing at least one of the reactant gases in parallel through each of the cells in the stack, but only into gas communication with a portion of an electrode of each cell; combining the exhaust gases from each of the cells and passing the mixture in parallel back through each cell but into gas communication with a different portion of the electrode; and continuing in like manner by combining the exhaust gases each time they exit the cells, and passing these mixed gases in parallel through each of the cells into gas communication with a different portion of each electrode until the entire electrode of each cell has been exposed to the reactant gas.

For example, the fuel could be passed in parallel over one half of each anode electrode on the first pass through the cells; the exhaust from the cells would be combined in a manifold and returned to the other half of each electrode on a second pass through the cells. Or, each electrode could be divided into four areas with the reactant gas traveling across the cells four times, each of the last three passes being a mixture of the exhaust gases from the preceding pass. This can be done with either the fuel or the oxidant or both.

It should be apparent that by this invention a blockage in one portion of a cell does not cut off or even reduce the mass flow of gas to other portions which are fed by intermediate manifold. Thus, the portion of the cell unaffected by the blockage is able to carry excess current. The blockage is not fatal to the entire cell as it might be with a serpentine flow through the cell wherein no gas or only small amounts of gas reach portions of the cell downstream and upstream of the blockage. The disadvantage of the sharp flow turns of a serpentine flow path is also eliminated by the present invention thereby resulting in a more uniform distribution of gas to all portions of the cell. A more uniform distribution results in higher gas utilization, another advantage of the present invention. Higher utilization is also achieved by the present invention because a blockage in one area of a cell disrupts the flow of gas over a smaller portion of the cell as compared to the prior art serpentine flow configuration.

In addition to these advantages, the present invention also reduces the problems caused by a maldistribution of current resulting from, for example, an area of an electrode which is deficient in catalyst thereby requiring the remainder of the electrode to carry all the current as hereinbefore discussed. In this invention other portions of the electrode do not see a reduced amount of gas and therefore are able to support an excess current.

The foregoing and other objects, features, and advantages of the present invention will become more apparent in the light of the following detailed description of preferred embodiments thereof as illustrated in the accompanying drawing.

BRIEF DESCRIPTION OF THE DRAWING

FIG. 1 is a perspective view, partly broken away, showing a fuel cell stack according to the present invention.

FIG. 2 is a sectional view, not to scale, of a fuel cell assembly from the stack of FIG. 1.

FIG. 3 is a sectional view taken in the plane of and looking down upon the nonelectrolyte facing surface of an anode electrode in the stack of FIG. 1.

FIG. 4 is a sectional view analogous to the sectional view of FIG. 3 but showing an alternate embodiment of the present invention.

DESCRIPTION OF THE PREFERRED EMBODIMENTS

Consider, as an exemplary embodiment of the present invention, the fuel cell stack generally represented by the numeral 10. The stack 10 comprises a plurality of fuel cell assemblies 12 which are electrically connected to one another in series. Each cell assembly comprises a separator plate 14 and an electrode assembly 16. Referring to FIG. 2, the electrode assembly 16 is seen comprising an anode or fuel electrode 18, a cathode or oxidant electrode 20, and an electrolyte holding matrix 22 disposed in the compartment formed therebetween. Each electrode includes a substrate 24 with a catalyst layer 26 disposed on the electrolyte facing surface thereof. The matrix 22 may be the electrolyte phosphoric acid, the substrate 24 carbon, and the catalyst platinum. But this is by way of example only and the invention is not intended to be limited thereto.

The separator plate 14 in combination with the nonelectrolyte facing surface of the anode electrode 18 defines a reactant gas fuel chamber 28. The plate 14a of the next adjacent cell in combination with the nonelectrolyte facing surface of the cathode electrode 20 defines a reactant gas oxidant chamber 30. In this embodiment the plates 14 include ribs 32, 33 which abut the electrodes 18, 20, respectively, for the purpose of providing support therefor. The central rib 32a also serves as a separating wall or barrier to divide the chamber 28 into two halves 28a and 28b. Except for the rib 32a, support ribs are not a requirement of the present invention; but if support ribs are used they are designed to permit a free flow and even distribution of a gas through each of the chambers 28a, 28b, and 30.

Returning now to FIG. 1, in the present embodiment the ribs 32 in the fuel chamber 28 extend the length of the cells 12 forming straight channels 34 of rectangular cross section and having openings 35 at both ends of the cell. The ribs 33 in the oxidant chambers 30 are perpendicular to the ribs 32 and extend across the width of the cells 12 forming channels having openings 36 on both sides of the stack 10. The stack 10 also includes an oxidant inlet manifold 38, an oxidant outlet manifold 40, a fuel inlet manifold 42, a fuel outlet manifold 44 and a fuel mixing manifold 46. A partition 47 separates the manifolds 42, 44.

The oxidant inlet manifold 38 defines a single large compartment or plenum in communication with all the openings 36 to the chambers 30. Oxidant, which in this embodiment is air from a suitable source (not shown), enters the manifold 38 via a conduit 48, passes in parallel through all the cells via the chambers 30, and exhausts into the outlet manifold 40 from whence it may be conducted away from the stack. Although in this embodiment the oxidant flows through the cells and is then carried away from the stack, this is not critical to the present invention. In stacks using certain types of cells, such as base electrolyte cells, the oxidant chamber may be dead-ended and there may be means to recirculate oxidant through the cells. These other configurations are contemplated as being within the scope of the present invention.

Referring now to FIG. 3 as well as FIG. 1, fuel, which in this embodiment is reformed hydrogen from a source not shown, enters the fuel inlet manifold 42 via a conduit 50. The path of the fuel is represented by the arrows 54. The fuel inlet manifold 42 is in gas communication with only those openings 34 on one side of the central rib 32a leading into the portion 28a of the chamber 28. The fuel passes in parallel through the chambers 28a of all the cells over a portion of each anode electrode, which in this embodiment is half of each electrode. It leaves the chambers 28a of the cells 12 and enters the mixing manifold 46 whereupon the partially vitiated gases are combined and pass back through the cells 12 via the chamber 28b on the other side of the central rib 32a. The fuel exhausts into the fuel outlet manifold 44 and is removed from the stack via a conduit 58. Note that even total blockage of one of the halves of the chamber 28 does not effect the flow of fuel to the other half of the cell since each half is fed from a manifold.

In order to minimize the detrimental effect of a blockage within one of the channels formed by the ribs 32, the ribs may have openings therein along their length (except for the central rib 32a) to permit the cross flow of gas between the various channels 34. Also, although the reactant gas chambers of the present invention are shown being divided into equally-sized portions, that is not a requirement of the present invention. Because the gas becomes more vitiated on each successive pass, it may be desirable to divide the chambers such that portions of the electrode covered on each successive pass of the gas are smaller and smaller. This is contemplated to be within the scope of the present invention.

In fuel cells wherein the electrodes are gas diffusion electrodes, as in the present embodiment, the substrate of the anode electrode is porous to the reactant gas to permit the fuel to reach the catalyst layer. The substrate may be, for example, porous carbon paper wetproofed with a hydrophobic polymer, but other materials may be suitable and would be known to those skilled in the art. The edge of the rib 32a merely contacts the surface of the electrode along its length, therefore, even though the rib 32a may divide the fuel chamber into two halves, fuel can enter the substrate on one side of the rib and diffuse laterally through the substrate over the other side of the cell. This would defeat one of the purposes of the present invention, which is to have a fuel distribution as uniform as possible to maximize utilization. In this embodiment substrate 24 is impregnated with a hydrophilic material along a narrow band 60 (FIG. 3) which lies along the central rib 32a dividing the chamber 28 in half. Unlike the remaining portion of the substrate 24, which is generally hyrophobic, the band 60 absorbs electrolyte from the matrix 22 thereby filling up the pores within the band 60 and preventing fuel crossover therethrough. The impregnating material must be compatible with the electrolyte and may be a hydrophilic mixture of particulate matter bound together with a suitable resin, such as carbon powder bound with Teflon; however, the foregoing is by way of example only and is not intended to limit the scope of the present invention. It may be that no special treatment of the substrate is required if gas crossover is very minimal to begin with.

An alternate embodiment of the present invention is depicted in FIG. 4. In this embodiment oxygen enters a manifold 100 via a conduit 102 and passes lengthwise through the cells in a single pass, emptying into a manifold 104 and leaving therefrom via a conduit 106. With regard to the fuel, the arrows 108 depict its flow through a cell and the manifolds of the stack. The surface of the anode electrode facing away from the electrolyte is designated by the numeral 110. In this embodiment the anode electrode is divided into four portions designated 110a, 110b, 110c, and 110d. The sections are separated by stripes 112 of hydrophilic material similar to the stripe 60 shown in the embodiment of FIG. 3. Each separator plate includes a rib corresponding to each of the stripes 112 and separating the fuel gas chamber into four sections. The fuel initially enters a first manifold 114 via a conduit 115 and passes over the surface 110a exhausting into a first mixing manifold 116. Exhausted gas from all the cells is combined in the manifold 116 and passes over the surface 110b, exhausting into a second mixing manifold 118. Once again the gases are combined from all the cells and they are then directed over the surface 110c and into a third mixing manifold 120 which thereupon directs the exhaust gases from the cells over the last portion (surface 110d) of each anode electrode. The gases finally exhaust into the manifold 122 and leave the stack via a conduit 124. From this embodiment it is apparent that each cell can be divided into any desired number of sections. The benefits resulting from increasing the number of sections must be weighed against added complexities of the manifolding system in order to determine how many sections is best for a particular application. It should also be apparent that this invention could be applied to the oxidant instead of the fuel or even to both within the same stack.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A fuel cell stack comprising:
    a plurality of fuel cells connected electrically in series, each cell comprising a first electrode and a second electrode spaced apart and defining an electrolyte compartment therebetween, said stack including separator means defining a first reactant gas chamber on the nonelectrolyte side of each first electrode and a second reactant gas chamber on the nonelectrolyte side of each second electrode, each of said first electrodes including a plurality of distinct portions adjacent one another, one of said portions being a first portion and one of said portions being a last portion, the sum of said plurality of portions being equivalent to substantially the whole first electrode, each of said first reactant gas chambers comprising a plurality of distinct adjacent portions, one chamber portion corresponding to each of said first electrode portions and in gas communication with its respective first electrode portion, each chamber portion including inlet means and outlet means, each cell also including barrier means physically separating said reactant gas chamber portions from each other;
    a first manifold in gas communication with said inlet means of said chamber portions corresponding to said first portion of each first electrode in said stack for introducing a reactant gas in parallel into said last mentioned chamber portions;
    a last manifold in gas communication with said outlet means of said chamber portions corresponding to said last portion of each first electrode in said stack; and
    a separate mixing manifold for each pair of adjacent chamber portions providing gas communication between the outlet means of one of said adjacent chamber portions of each cell and the inlet means of the other of said adjacent chamber portions of each cell for combining the exhaust gas from said last mentioned outlet means and directing the combined gases in parallel into said last mentioned inlet means, said first manifold, mixing manifolds, and last manifold being in series gas communication with each other via said chamber portions.

2. The fuel cell stack according to claim 1 wherein each of said first electrodes consists of two distinct portions, one being said first portion and the other being said last portion.

3. The fuel cell stack according to claim 1 wherein said first electrodes are fuel electrodes and said first chambers are fuel gas chambers.

4. The fuel cell stack according to claim 1 wherein each of said first electrodes comprises a substrate and a catalyst layer, said substrate being porous to the reactant gas, said catalyst layer being disposed on the electrolyte facing side of said substrate, wherein said barrier means is at least one continuous rib integral with said separator means defining a separating wall between each of said distinct adjacent portions of each of said first chambers, said rib having an edge in contact with an area of said substrate along the length of said rib, said area of said substrate including an impregnation of material adapted to prevent diffusion of reactant gas under said rib through said substrate during operation of said stack.

5. The fuel cell stack according to claim 4 wherein said impregnation is an impregnation of a hydrophilic material compatible with the electrolyte and adapted to absorb electrolyte from said electrolyte compartment during operation of said cell.

6. The fuel cell stack according to claim 4 wherein said impregnation is an impregnation of a hydrophilic mixture of particulate matter bound together with a resin and having the characteristic that it is compatible with the electrolyte.

7. A fuel cell stack comprising:
    a plurality of fuel cells connected electrically in series, each cell comprising a first electrode and a second electrode spaced apart and defining an electrolyte compartment therebetween, each of said first electrodes including a first portion and a second portion distinct from said first portion, said first and second portions together comprising the entire electrode, said stack including separator means defining a first reactant gas chamber on the nonelectrolyte side of each first electrode and a second reactant gas chamber on the nonelectrolyte side of each second electrode, each of said first reactant gas chambers comprising a first distinct portion in gas communication with said first portion of said first electrode and having first inlet means and first outlet means, each of said first chambers also including a second distinct portion in gas communication with said second portion of said first electrode and including second inlet means and second outlet means, each cell also including barrier means physically separating said reactant gas chamber portions from each other;

first manifold means in gas communication with said first inlet means for supplying reactant gas in parallel to said first portions of said first electrodes via said first portion of each of said first chambers; and second manifold means in gas communication with said first outlet means and in gas communication with said second inlet means for collecting the reactant gas exhausting from said first portions of said first chambers and supplying it in parallel to said second portions of said first electrodes via said second portions of said first chambers.

8. The fuel cell stack according to claim 7 wherein said first electrodes are fuel electrodes and said first chambers are fuel gas chambers.

9. The fuel cell stack according to claim 8 wherein each of said first electrodes comprises a substrate and a catalyst layer, said substrate being porous to the reactant gas, said catalyst layer being disposed on the electrolyte facing side of said substrate, wherein said barrier means is at least one rib integral with said separator means defining a separating wall between said first and second portions of each first chamber, said rib having an edge in contact with an area of said substrate along the length of said rib, said area of said substrate including an impregnation of material adapted to prevent diffusion of reactant gas under said rib through said substrate of said stack.

10. The fuel cell stack according to claim 9 wherein said impregnation is an impregnation of a mixture, said mixture including particulate matter bound together with a resin and having the characteristic that it is hydrophilic and compatible with the electrolyte.

11. In a fuel cell stack comprising a plurality of fuel cells connected electrically in series, each cell comprising a first electrode and a second electrode spaced apart and defining an electrolyte compartment therebetween, said stack including means defining a first reactant gas chamber on the nonelectrolyte side of each first electrode and a second reactant gas chamber on the nonelectrolyte side of each second electrode, the method of supplying a reactant gas to said first electrodes of said stack comprising the steps of:
1. delivering a reactant gas into gas communication with a distinct portion of each first electrode in the stack by passing said reactant gas from manifold means in parallel through only a portion of each first reactant gas chamber in the stack;
2. exhausting said gas from said last mentioned portion of each first reactant gas chamber into manifold means different from said earlier mentioned manifold means;
3. delivering said exhausted gas into gas communication with a distinct portion of each first electrode in the stack different from said earlier mentioned distinct portions by passing said exhausted gas from said last mentioned manifold means in parallel through said different, distinct portion of each first reactant gas chamber;
4. repeating steps 2 and 3 if and as many times as necessary until substantially the entire first electrode of every cell in the stack has been in gas communication with the reactant gas.

12. The method according to claim 11 wherein said first electrodes are fuel electrodes and said first reactant gas chambers are fuel gas chambers.

13. The method according to claim 12 wherein said cells are adapted to use an acid electrolyte.

14. The method according to claim 3 wherein said cells are adapted to use an acid electrolyte.

15. The fuel cell stack according to claim 1 wherein said barrier means includes at least one continuous rib disposed within said first reactant gas chamber and extending completely across and in contact with the surface of said first electrode.

16. The fuel cell stack according to claim 15 wherein said rib is integral with said separator means.

17. The fuel cell stack according to claim 15 wherein said barrier means includes a plurality of parallel continuous ribs each extending completely across and in contact with the surface of said first electrode.

* * * * *